United States Patent [19]

Gruelle

[11] Patent Number: 4,964,235
[45] Date of Patent: Oct. 23, 1990

[54] DISPENSING FISH LURE

[76] Inventor: Charles Gruelle, P.O. Box 721, Battle Ground, Wash. 98604

[21] Appl. No.: 379,090

[22] Filed: Jul. 13, 1989

[51] Int. Cl.⁵ ............................................. A01K 85/00
[52] U.S. Cl. ................................................. 43/42.06
[58] Field of Search ..................... 43/42.06, 42.05, 41, 43/44.99

[56] References Cited

U.S. PATENT DOCUMENTS

| | | | |
|---|---|---|---|
| 2,556,634 | 6/1951 | Redinger | 43/42.06 |
| 2,666,275 | 1/1954 | Smith | |
| 2,674,058 | 4/1954 | Lindenberg | |
| 2,791,058 | 5/1957 | Bettini | 43/42.06 |
| 2,836,001 | 5/1958 | Silen | |
| 2,987,844 | 6/1961 | Hill | 43/42.06 |
| 3,280,497 | 10/1966 | Tschida | |
| 3,413,749 | 12/1968 | Jeffers | |
| 3,688,430 | 9/1972 | Balch | 43/42.06 |
| 3,969,840 | 7/1976 | Charron | 43/42.06 |
| 3,987,575 | 10/1976 | Morita | |
| 3,991,544 | 11/1976 | Pieper | |
| 4,133,134 | 1/1979 | Cheng | |
| 4,267,658 | 5/1981 | Brown | 43/42.06 |
| 4,550,521 | 11/1985 | Hayden | |
| 4,823,497 | 4/1989 | Pierce | 43/44.99 |

Primary Examiner—Kurt Rowan
Attorney, Agent, or Firm—Kolisch, Hartwell & Dickinson

[57] ABSTRACT

A scent-dispensing fishing lure includes a liquid-dispensing cavity which receives a fish-attracting liquid. The lure includes a mixing mechanism for mixing the fish-attracting liquid and environmental water in the cavity. An inlet port is located at the front end of the cavity and allows entry of environmental water into the cavity while an outlet port is located at the rear end of the cavity and allows exit of a mixture of environmental water and the fish-attracting liquid into the water environment.

19 Claims, 1 Drawing Sheet

DISPENSING FISH LURE

BACKGROUND AND SUMMARY OF THE INVENTION

The instant invention relates to fishing lures, and specifically to a fishing lure which dispenses a fish-attracting liquid as the lure is drawn through a body of water.

There are as many theories as to the best way to entice a fish to bite on a hook as there are fishermen attempting to get the fish to bite. One theory holds that the fish is attracted primarily by scent. To this end, a number of lure devices have been proposed which provide a means for introducing a natural or artificial scent into a body of water in the vicinity of a fishing lure, and hopefully also in the vicinity of a fish. Lures are known which contain a variety of cavities designed to hold fishattracting scents. In some instances, the cavity is surrounded by a flexible wall which, under the influence of water pressure, partially collapses, thereby dispensing the fish-attracting scent into the water. Other cavities are designed to be punctured by a fish hook, thereby releasing the scent contained therein.

A fishing lure described in U.S. Pat. No. 3,280,497 to Tschida is designed with a passage which receives live bait therein, thereby dispensing a natural scent into the water.

U.S. Pat. No. 2,836,001 to Silen includes a lure body having a passage therein, where the passage is designed to receive a scent-impregnated absorbent material.

The above-identified designs have certain limitations to the extent that they do not dispense scent into the water for a particularly long time period. Additionally, a number of the known lures are not capable of being refilled, or are difficult to refill once the scent has been dispensed therefrom.

An object of the instant invention is to provide a fishing lure which is capable of dispensing a fish-attracting liquid for an extended period of time.

Another object of the invention is to provide a fishing lure which is easily refillable with a fish-attracting liquid.

A further object of the invention is to provide a fishing lure which has a mixing mechanism contained therein for mixing a fish-attracting liquid with environmental water.

Another object of the invention is to provide a fishattracting scent dispensing lure which may be formed in a variety of shapes, such as in a shape simulating an aquatic creature.

The fishing lure of the invention includes a liquiddispensing cavity which receives a fish-attracting liquid. The lure includes a mixing mechanism for mixing the fish-attracting liquid in environmental water in the cavity. An inlet port is located at the front end of the cavity and allows entry of environmental water into the cavity while an outlet port located at the rear end of the cavity and allows exit of a mixture of environmental water and the fish-attracting liquid into the water environment.

DETAILED DESCRIPTION OF THE EMBODIMENTS

Figure 1:
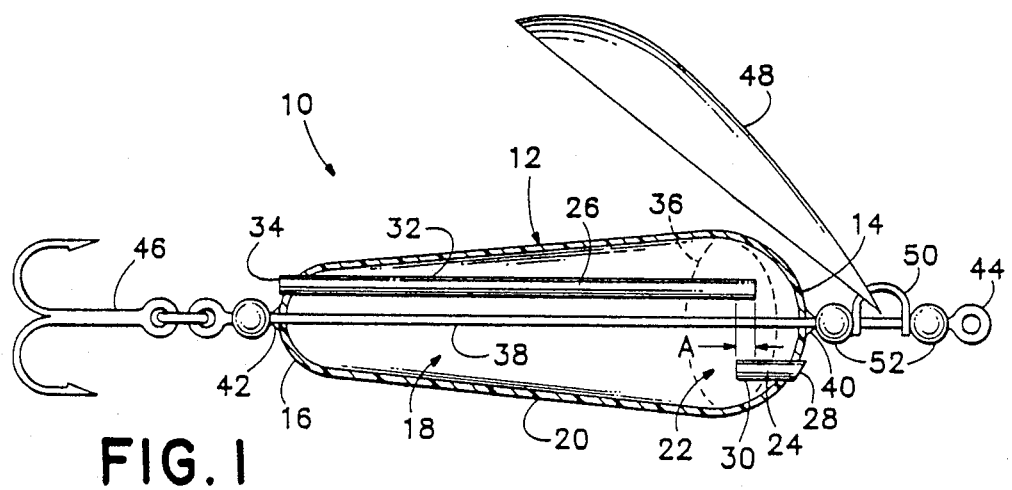
FIG. 1 is a median sectional view of the fishing lure of the invention, with portions broken away to show detail.

Turning now to the drawings, and initially to FIG. 1, a fishing lure constructed according to the invention is shown generally at 10. Lure 10 includes a lure body 12 which has a front end 14 and a rear end 16. Body 12 includes a fluid-tight cavity 18 which is intended to receive a fish attracting liquid, generally in the form of a scented fluid, such as fish or shrimp oil, or any of the other numerous fish-attracting scents which are available on the market.

A wall 20 extends about cavity 18, defining the cavity and serving to retain fluid therein. In this embodiment of the invention, wall 20 is formed of a plastic material which is easily moldable and is oil resistant.

Lure 10 includes mixing means, shown generally at 22. Mixing means mixes the fish-attracting scent with environmental water which the lure is drawn through. In the preferred embodiment, mixing means includes an inlet passage 24 and an outlet passage 26.

Inlet passage 24 includes an inlet port 28 which is located at the front end of cavity 18. Port 28 communicates with the interior of cavity 18 through passage 24, which is formed in an elongate inlet tube 30. Inlet tube 30 and passage 24 extend from the front 14 of cavity 18 rearwardly into the cavity. Tube 30 is sealed to the front end of the cavity wall, providing the only entrance for environmental water into the cavity through inlet port 28.

Outlet passage 26 is enclosed by an outlet tube 32. Passage 26 communicates with the interior of cavity 28 and the environment through an outlet port 34. Outlet tube 32 extends from the rear end 16 of cavity wall 20 forwardly into cavity 18 and provides an exit for a mixture of environmental water and liquid scent. Outlet tube 32 is sealed to the rear end of the cavity wall.

A mixing zone 36 is located adjacent the free ends of inlet tube 30 and outlet tube 32. It is in this region that the environmental water mixes with the fluid in cavity 18. The mixing zone is formed in a region which contains, what is referred to herein as the overlapped free ends of inlet and outlet tubes. The free ends overlap by a predetermined amount, indicated by the letter "A" in the drawing, which in the preferred embodiment is between 0.020 and 0.030 inches (approximately .5 millimeters). Put another way, the free end of the inlet passage is located downstream of the free end of the outlet passage. This arrangement promotes turbulence within the cavity, and specifically within mixing zone 36 for mixing the fish-attracting liquid and the environmental water, as the water enters cavity 18 through passage 24, under the influence of water pressure impacting the forward end of cavity wall 20.

As is to be expected, the interior diameters of the inlet and outlet passages affects the amount of time that a quantity of fish-attracting fluid will remain in cavity 18. Table 1, below, depicts the amount of time which a fish-attracting liquid scent will remain in cavity 18, beginning with a cavity volume of 5 milliliters and a trolling speed of between 1 and 5 miles per hour.

TABLE I

| Inlet Tube Size (in inches) | Outlet Tube Size (in inches) | Time (in minutes) |
|---|---|---|
| .125 | .100 | 4–6 |

TABLE I-continued

| Inlet Tube Size (in inches) | Outlet Tube Size (in inches) | Time (in minutes) |
| --- | --- | --- |
| .125 | .065 | 7-10 |
| .100 | .065 | 8-14 |
| .100 | .030 | 12-20 |
| .065 | .065 | 15-20 |
| .065 | .030 | 22-30 |
| .030 | .030 | 25-45 |

To complete the description of lure 10, in a first embodiment, a wire 38 extends through body 12 and is sealed, by a suitable sealer, at either end of the body at 40, 42. Wire 38 provides a connection mechanism between a fishing line which is connected to an eye 44, formed at one end of wire 38 and a hook 46 which is connected, by suitable connection mechanism, to the other end of wire 38. In this embodiment, a spinner 48 is attached to the one end of wire 38 by means of a clevis 50, and is spaced from eye 44 and body 12 by means of suitable spacers 52.

Although body 12 may be constructed in a variety of forms, in the form shown in connection with lure 10, the provision of spinner 48 is believed to provide a certain pulsing effect to the mixing of environmental water and the fish-attracting liquid in cavity 18 as the rotation of spinner 48 about body 12 will periodically interrupt or, decrease the water pressure on inlet port 28, thereby increasing the turbulence inside cavity 18.

Figure 2:
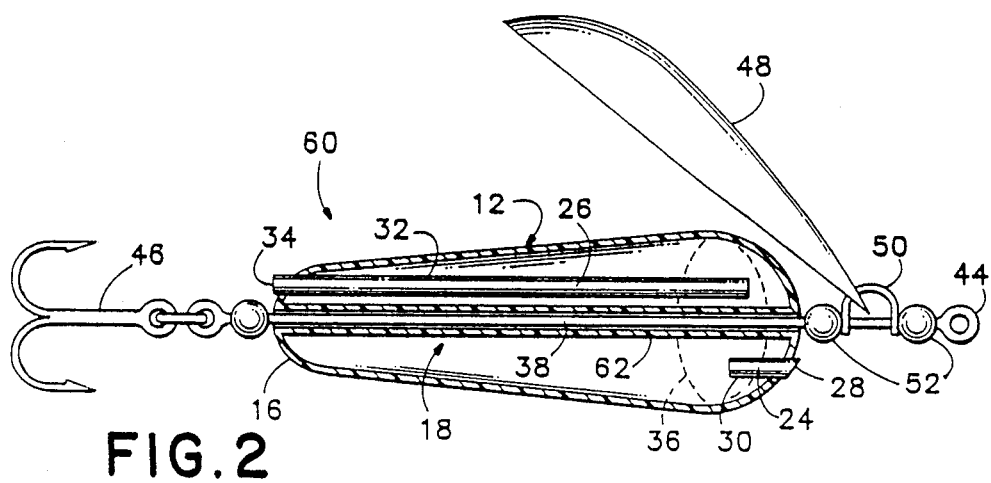
FIG. 2 is a median sectional view of a modified form of the invention.

Turning now to FIG. 2, a second form of the invention is depicted generally at 60. Lure 60 is constructed very similarly to lure 10, and like parts are identically numbered. Lure 60, however, includes a wire passage 62 which is formed through cavity 18, and provides fluid-tight separation between wire 38 and cavity 18. This allows body 12 to rotate relative to wire 38 and provides a somewhat freer turning mechanism for spinner 48, wire 38 and hook 46. Additionally, as sealer 40, 42 in lure 10 may degenerate over a period of time, the elimination of such sealer in lure 60 provides additional longevity for the lure.

Figure 3:
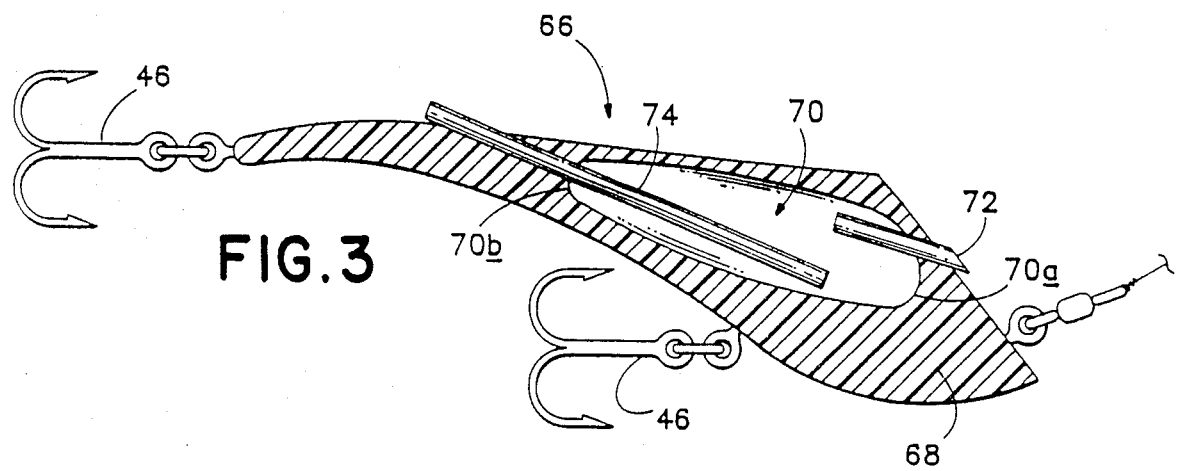
FIG. 3 is a side view of another modified form of the invention, with portions broken away to show detail.

Turning now to FIG. 3, another embodiment of a lure constructed according to the invention is shown generally at 66. In this embodiment, lure 66 includes a body 68 which is constructed to simulate an aquatic creature. Body 68 encloses a cavity 70 which includes a front end 70a, having an inlet tube 72 passing therethrough into the interior of cavity 70, and a rear end 70b, which has an outlet tube 74 passing therethrough, providing communication between the interior of cavity 70 and the environmental water.

The lure may be provided in an add-on form, such that a cavity-containing body may be provided which is suitable for placement on a fishing line above a conventional lure or bait and which will dispense a fish-attracting scent as it is drawn through the water.

In operation, the lure of the invention is fixed to a fishing line and filled with fish-attracting scented fluid. One way to fill the lure cavity is by means of a syringe which initially draws the fluid from a storage container. The syringe has an outlet which is sized to be received in the inlet port of 10 the lure. The lure is maintained in a upright condition, with the front end 14 at the top thereof. The fluid is injected into the lure with the syringe until the fluid reaches a level just below the upper, free end of outlet passage 26. The lure is then cast into the water or trolled behind a boat.

As the lure is drawn through the water, water pressure at inlet port 28 forces water through inlet passage 24 and into cavity 18. The environmental water mixes with the fluid in the cavity and a mixture of water and fluid leaves cavity 18 through outlet passage 26, forming a scent trail behind the lure which will attract fish to the lure.

As noted in Table 1, the provision of inlet/outlet passages of varying diameters will greatly affect the time during which the lure will dispense scent. The provision of smaller diameter passages increases the time over which scent will be dispensed, however, the concentration of scent in the water will not be as great as it would if larger diameter passages are provided. Factors such as water temperature and speed will affect the dispensing time of the lure. Warmer water will lower the viscosity of oil-based scents, making them flow faster. Water speed and turbulence will affect both the rate at which the scent is dispensed and the local concentration of the scent in the water around the lure.

Thus, a fishing lure with a mechanism for dispensing a fish-attracting scent has been disclosed. The lure will provide scent for a variety of time periods, depending on the relative sizes of the inlet and outlet passages. Although a preferred embodiment of the invention, and modifications thereto have been disclosed, it should be understood that further modifications and variations may be made thereto without departing from the scope of the invention as defined in the appended claims.

What I claim is:

1. A fishing lure comprising:
   a liquid-dispensing cavity for receiving a fish-attracting liquid, said cavity having front end, a rear end and a wall extending thereabout, the lure being drawn through a body of water front-end first;
   an inlet port located at said front end of said cavity for allowing entry of environmental water into said cavity;
   an outlet port located at said rear end of said cavity for allowing exit of a mixture of environmental water and fish-attracting liquid into the water environment; and
   turbulent-mixing means for mixing the fish-attracting liquid and environmental water in said cavity, wherein said mixing means includes an inlet passage, connected to said inlet port, and an outlet passage, connected to said outlet port, each of said passages extending through said wall into said cavity, the free end of said inlet passage being located downstream of the free end of the said outlet passage to promote turbulence within said cavity for mixing the fish-attracting liquid and the environmental water.

2. The lure of claim 1 wherein said inlet-passage free end extends beyond said outlet-passage free end by a predetermined distance.

3. The lure of claim which further includes an elongate wire extending through said cavity 4. The lure of claim 3 which includes at least one spinner rotatably attached to said wire adjacent one end thereof, at least one hook attached to said wire adjacent the other end thereof, and wherein said wire provides means for attaching the lure to a fishing line.

5. The lure of claim 1 which includes a lure body surrounding said cavity wherein said lure body simulates an aquatic creature.

6. A fishing lure comprising:

a lure body having front and rear end for drawing through a body of water front-end first;

a fluid-tight cavity formed in said body for receiving a fish-attracting scent therein, said cavity having a wall thereabout;

an inlet tube located at the front end of said body and extending into said cavity;

an outlet tube located at the rear end of said body and extending into said cavity;

said inlet tube and said outlet tube having free ends in said cavity, said free ends being constructed and arranged to overlap one another in said cavity by a predetermined amount.

7. The lure of claim 7 wherein each of said tubes is sealed to said cavity wall and has a free end inside said cavity, wherein said free end of said inlet tube extends rearward of the free end of said outlet tube by a predetermined distance, such overlapping providing mixing of the scent and environmental water in said cavity.

8. The lure of claim 7 wherein said predetermined distance is at least 0.020 inches (0.5 mm).

9. The lure of claim 6 which further includes a wire and a wire passage extending through said lure body for allowing passage of said wire through the lure body.

10. The lure of claim 9 which includes a spinner rotatably attached to said wire.

11. The lure of claim 6 wherein said lure body simulates an aquatic creature.

12. A fishing lure comprising:
a lure body having a front end and a rear end;
means attached to said front end of said body for drawing same through a body of water in a forward direction;
a cavity formed in said lure body for receiving a fishattracting scented liquid, said cavity being surrounded by a liquid-tight wall;

an elongate inlet tube secured through said cavity wall adjacent the front end of said lure body and extending rearwardly in said cavity, said inlet tube having a passage therethrough communicating with the interior of said cavity and the outside of said cavity for allowing entry of water from the body of water to the interior of said cavity;

an elongate outlet tube secured through said cavity wall adjacent the rear end of said lure body and extending forwardly in said cavity, said outlet tube having a passage therethrough communicating with the interior of said cavity and the outside of said cavity for allowing exit of a water/scented liquid mixture from said cavity to the body of water.

13. The lure of claim 12 wherein the ends of said inlet tube and said outlet tube extending into said cavity overlap one another by a predetermined amount.

14. The lure of claim 13 which further includes an elongate wire extending beyond both ends and through said lure body 15. The lure of claim 14 wherein said body includes a wire passage therethrough for receiving said elongate wire and allowing free, relative rotation of said wire and said body.

16. The lure of claims 14 or 15 which includes at least one spinner rotatably attached to said wire adjacent one end thereof and at least one hook attached to said wire adjacent the other end thereof.

17. The lure of claim 13 wherein said lure body simulates an aquatic creature.

18. The lure of claim 17 which includes at least one hook attached to said lure body and which includes means for attaching said lure body to a fishing line.

19. The lure of claim 12 wherein said tubes overlap one another by at least 0.020 inches (0.5 mm).

* * * * *